US012456843B2

(12) United States Patent
Chen

(10) Patent No.: US 12,456,843 B2
(45) Date of Patent: Oct. 28, 2025

(54) ELECTRICAL CONNECTOR HAVING METALLIC SHELL WITH UNITARY GROUNDING MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 369 days.

(21) Appl. No.: 17/981,472

(22) Filed: Nov. 7, 2022

(65) Prior Publication Data

US 2023/0147620 A1 May 11, 2023

(30) Foreign Application Priority Data

Nov. 8, 2021 (CN) ......................... 202122714473.6

(51) Int. Cl.

| | |
|---|---|
| ***H01R 13/6582*** | (2011.01) |
| ***H01R 12/73*** | (2011.01) |
| ***H01R 13/50*** | (2006.01) |
| ***H01R 13/6585*** | (2011.01) |
| ***H01R 13/6594*** | (2011.01) |
| *H01R 12/71* | (2011.01) |
| *H01R 13/658* | (2011.01) |
| *H01R 13/6581* | (2011.01) |
| *H01R 13/6591* | (2011.01) |

(52) U.S. Cl.

CPC ......... *H01R 13/6582* (2013.01); *H01R 12/73* (2013.01); *H01R 13/50* (2013.01); *H01R 13/6585* (2013.01); *H01R 13/6594* (2013.01); *H01R 12/71* (2013.01); *H01R 12/712* (2013.01); *H01R 12/716* (2013.01); *H01R 13/658* (2013.01); *H01R 13/6581* (2013.01); *H01R 13/6591* (2013.01)

(58) Field of Classification Search

CPC .... H01R 13/6582; H01R 12/73; H01R 13/50; H01R 13/6585; H01R 13/6594; H01R 12/71; H01R 12/712; H01R 12/716; H01R 13/658; H01R 13/6581; H01R 13/6591

See application file for complete search history.

(56) References Cited

U.S. PATENT DOCUMENTS

| | | | | |
|---|---|---|---|---|
| 10,446,985 | B2 | 10/2019 | Ooi | |
| 11,075,475 | B2 | 7/2021 | Chen | |
| 11,527,847 | B2 * | 12/2022 | Oosaka | H01R 13/518 |

FOREIGN PATENT DOCUMENTS

| | | | |
|---|---|---|---|
| CN | 201072831 | Y | 6/2008 |
| CN | 209571614 | U | 11/2019 |
| CN | 108390213 | B | 10/2021 |

* cited by examiner

*Primary Examiner* — Justin M Kratt

(74) *Attorney, Agent, or Firm* — Ming Chieh Chang

(57) ABSTRACT

An electrical connector includes: an insulative housing having a receiving channel; plural contacts secured to the insulative housing and exposed to the receiving channel; and a metallic shell secured to the insulative housing and exposed to the receiving channel, the metallic shell having a unitary grounding member, wherein the grounding member has a pair of opposing fingers spaced apart a gap.

4 Claims, 10 Drawing Sheets

ELECTRICAL CONNECTOR HAVING METALLIC SHELL WITH UNITARY GROUNDING MEMBER

BACKGROUND OF THE INVENTION

1. Field of the Invention

The present invention relates to an electrical connector having an insulative housing and a metallic shell secured to the insulative housing, wherein the metallic shell has a grounding member for engaging a grounding piece of a complementary connector.

2. Description of Related Art

China Patent Application Publication No. 108390213 discloses an electrical connector assembly including a first connector having a first shielding member and a second connector having a second shielding member, wherein both the first and second shielding members are discrete. U.S. Pat. No. 11,075,475 discloses an electrical connector including: an insulative housing having an island and a receiving channel; a plurality of contacts secured to the insulative housing and exposed to the receiving channel; a metallic shell member secured to the insulative housing and exposed to the receiving channel, and a shielding/grounding member unitarily extending from the metallic shell member, wherein the shielding/grounding member has protrusions at two opposite longitudinal ends thereof outside the island for engaging with locking arms of a pair of locking members of a complementary connector.

SUMMARY OF THE INVENTION

An electrical connector comprises: an insulative housing having a receiving channel; a plurality of contacts secured to the insulative housing and exposed to the receiving channel; and a metallic shell secured to the insulative housing and exposed to the receiving channel, the metallic shell having a unitary grounding member; wherein the grounding member has a pair of opposing fingers spaced apart a gap.

DETAILED DESCRIPTION OF THE PREFERRED EMBODIMENT

Figure 1:
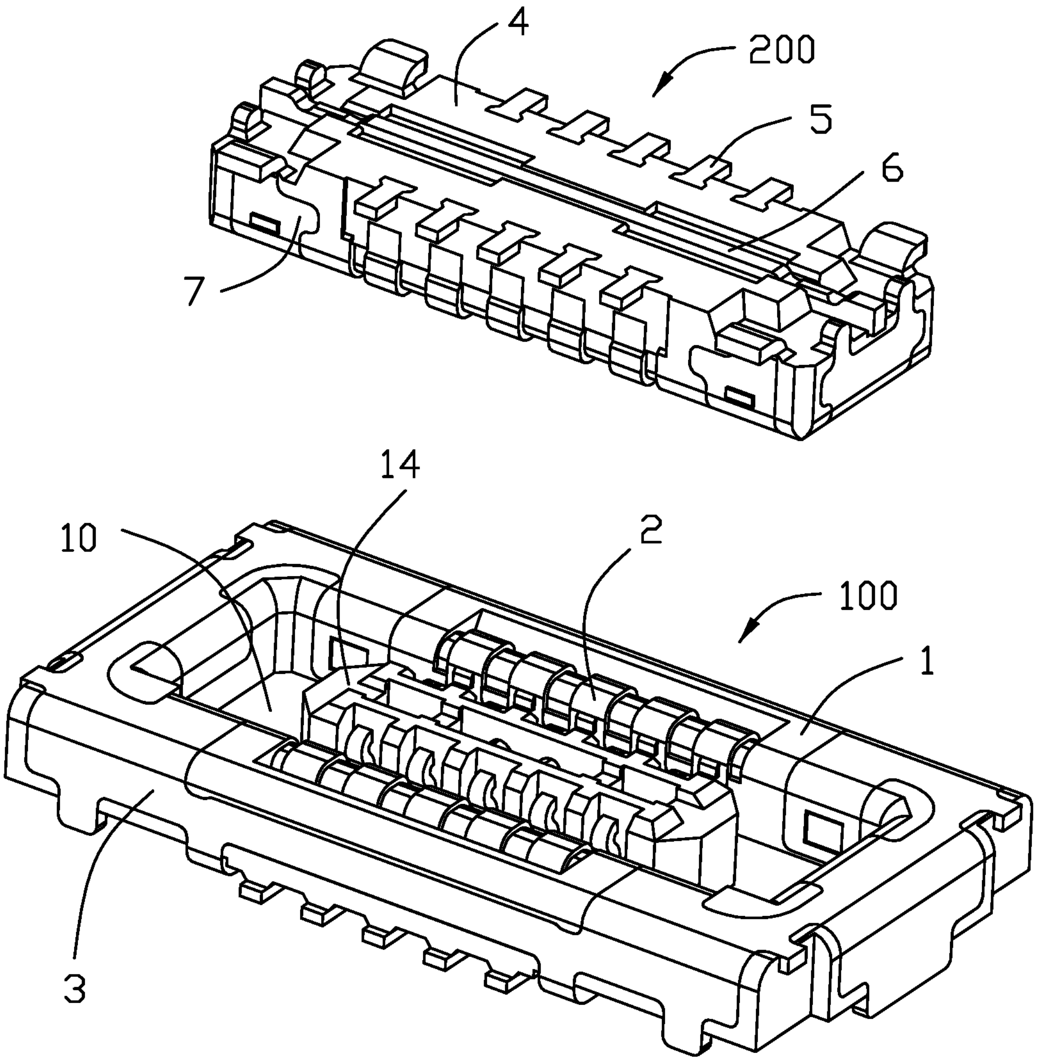
FIG. 1 is a perspective view of an electrical connector assembly in accordance with the present invention.
Figure 2:
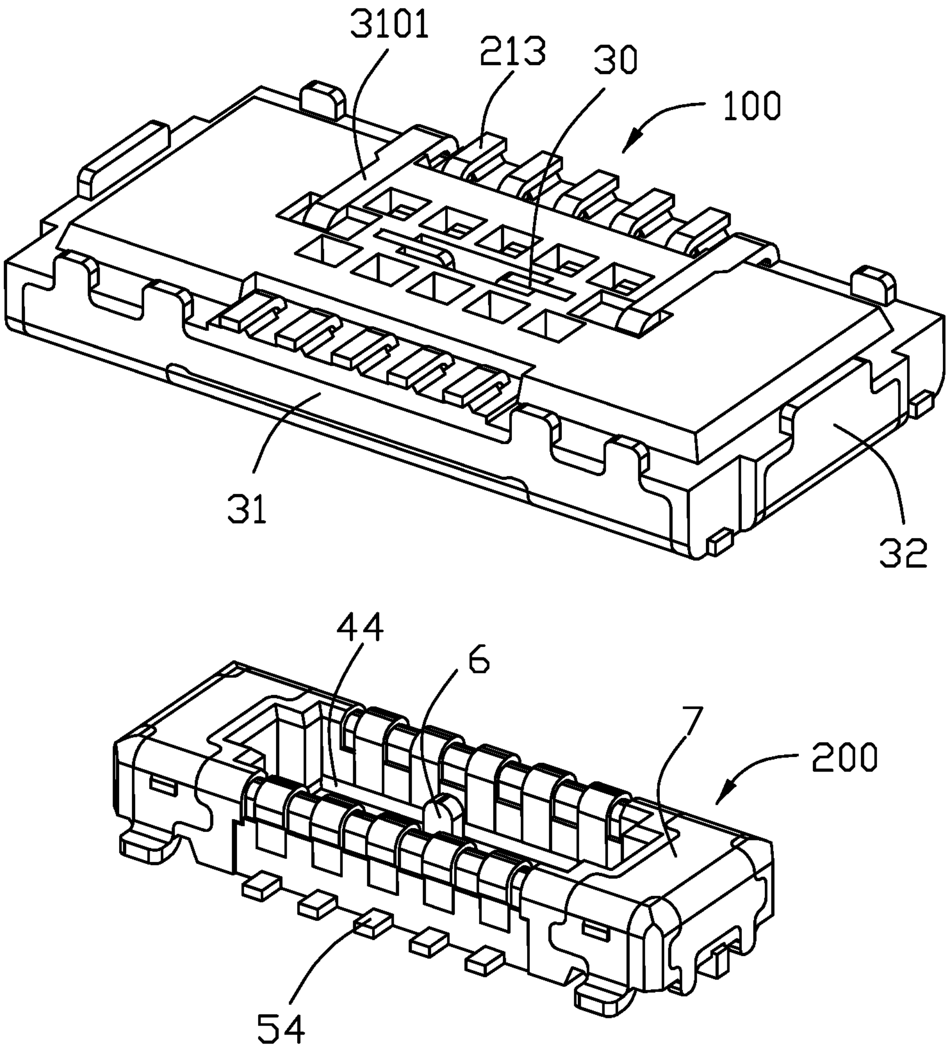
FIG. 2 is another perspective view of the electrical connector assembly.

Referring to FIGS. 1-10, an electrical connector assembly includes an electrical connector 100 and a mating electrical connector 200 to be mounted on printed circuit boards (not shown). The electrical connector 100 includes an elongate insulative housing 1 having an island 14 and a receiving channel 10, a plurality of contacts 2 secured to the insulative housing 1 and exposed to the receiving channel 10, and a metallic shell 3 secured to the insulative housing 1 and exposed to the receiving channel 10. The mating electrical connector 200 includes an elongate insulative housing 4 having a receiving space 44, a plurality of contacts 5 secured to the insulative housing 4 and exposed to the receiving space 40, a middle grounding piece 6 secured to the insulative housing 4, and a pair of holding elements 7 secured to two opposite ends of the insulative housing 4.

Figure 3:
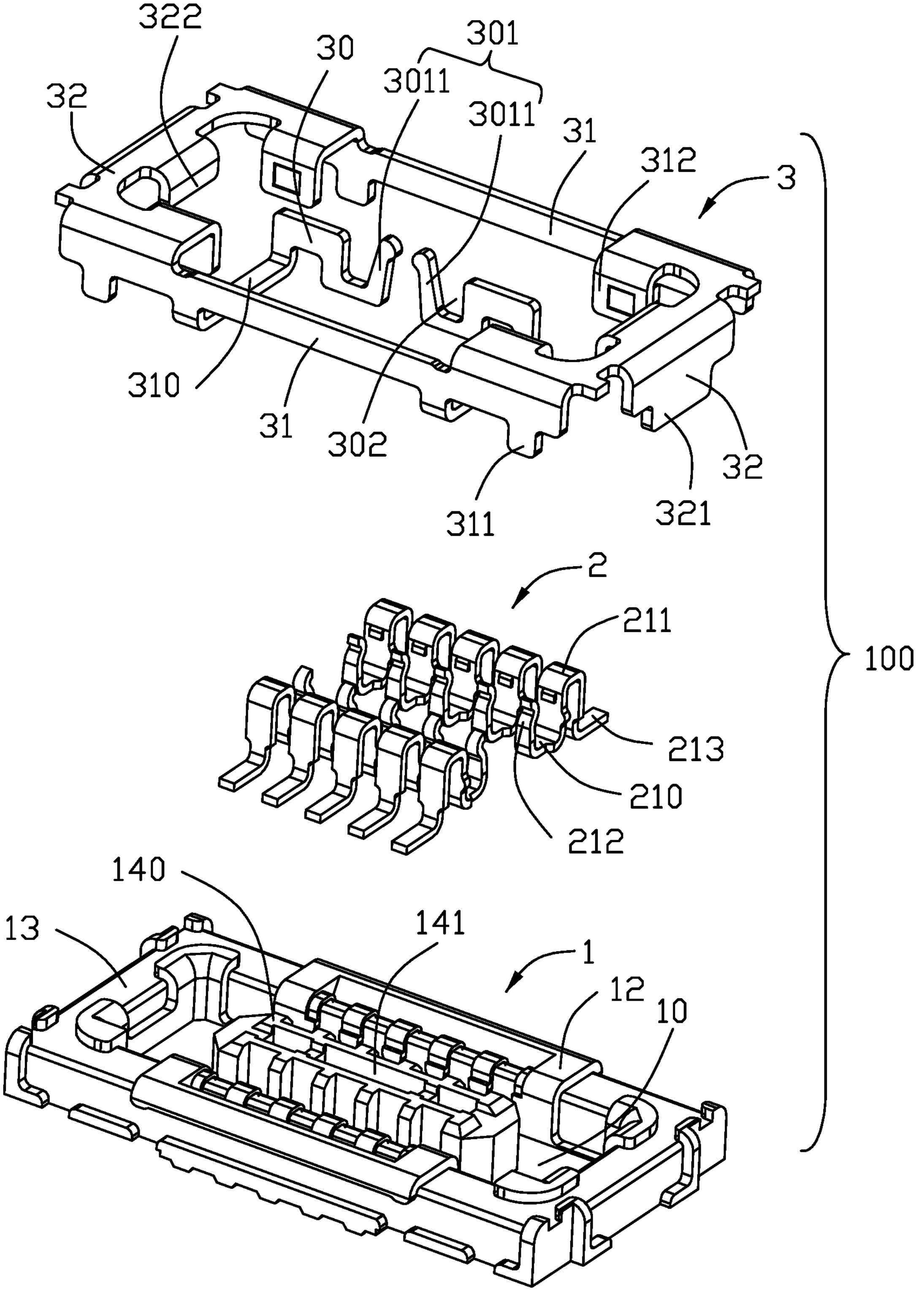
FIG. 3 is an exploded view of an electrical connector of the electrical connector assembly.
Figure 4:
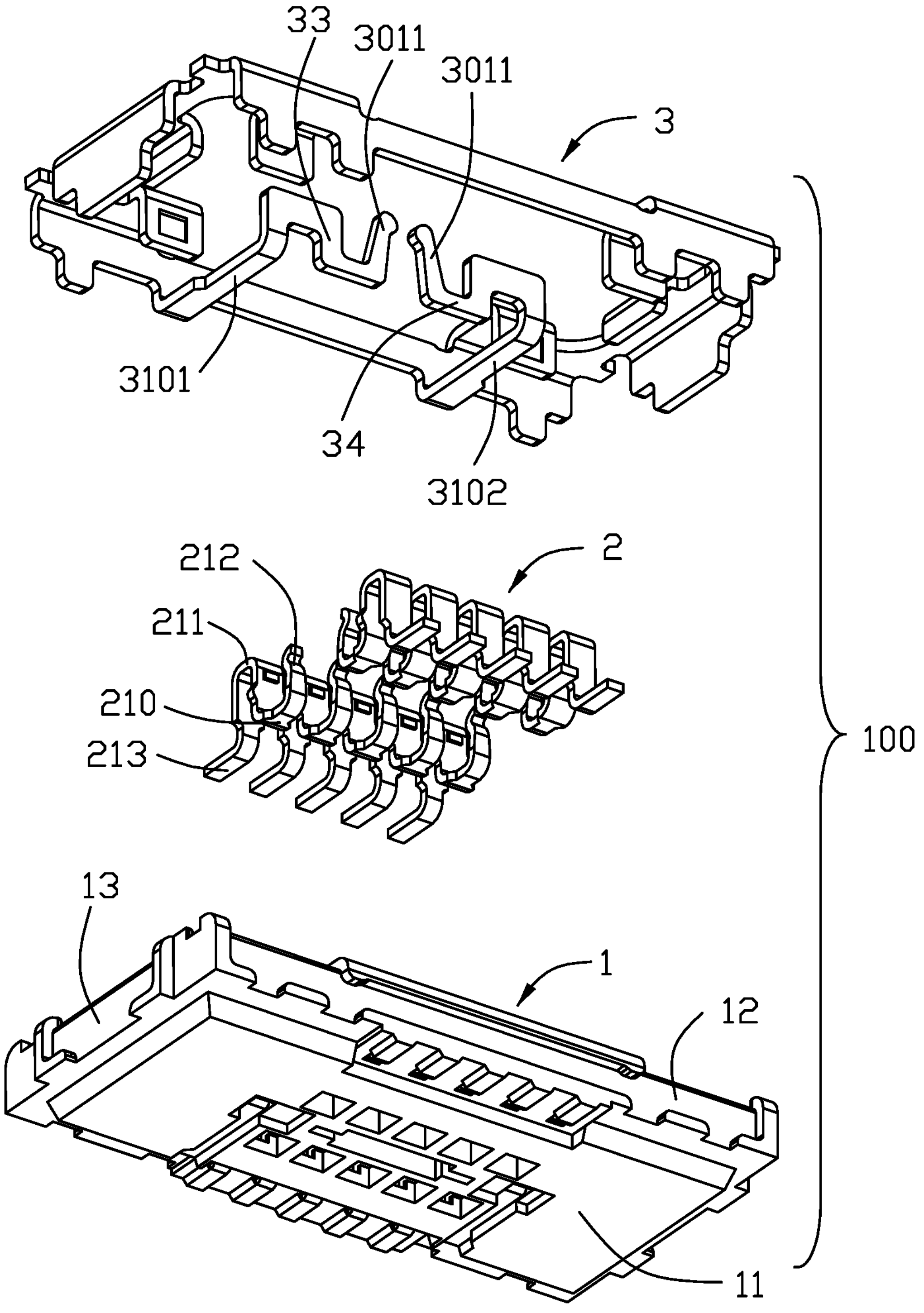
FIG. 4 is another exploded view of the electrical connector.

As best seen in FIGS. 3 and 4, the insulative housing 1 of the electrical connector 100 has a base 11, a pair of longitudinal walls 12 and a pair of end walls 13, and an island 14, which together define the receiving channel 10. The contacts 2 are arranged, e.g., insert-molded, with the insulative housing 1 in two rows in a manner known in this art. Each contact 2 has a bottom portion 210, an inverted U-shaped securing portion 211, a contacting arm 212, and a tail 213.

The shell 3 has a pair of side walls 31 and a pair of end walls 32, surrounding a periphery of the insulative housing 1, and a unitary grounding member 30. Each side wall 31 has one or more soldering portions 311 and each end wall 32 a soldering portion 321. Each side wall 31 further has a pair of portions 312 exposed to an inside surface of the wall 12 and each end wall 32 further has a soldering portion 322 exposed to an inside surface of the end wall 12. The grounding member 30 extends longitudinally and is connected to a lower portion 310, e.g., a pair of portions 3101 and 3102, of a corresponding side wall 31.

The grounding member 30 has an engaging structure 301 in the form of a pair of arms 33 and 34 separated from each other. A respective finger 3011 is located at a free end of each of the pair of arms 33 and 34. The island 14 has a slot 141 through an upper surface 140 thereof opening upward for accessing the engaging structure 301 and the pair of opposing fingers 3011 are located in the slot 141 of the island 14. The pair of opposing fingers 3011 extend slightly inclined toward each other. There is a room 302 behind each finger 3011 for movement without hinderance.

Figure 5:
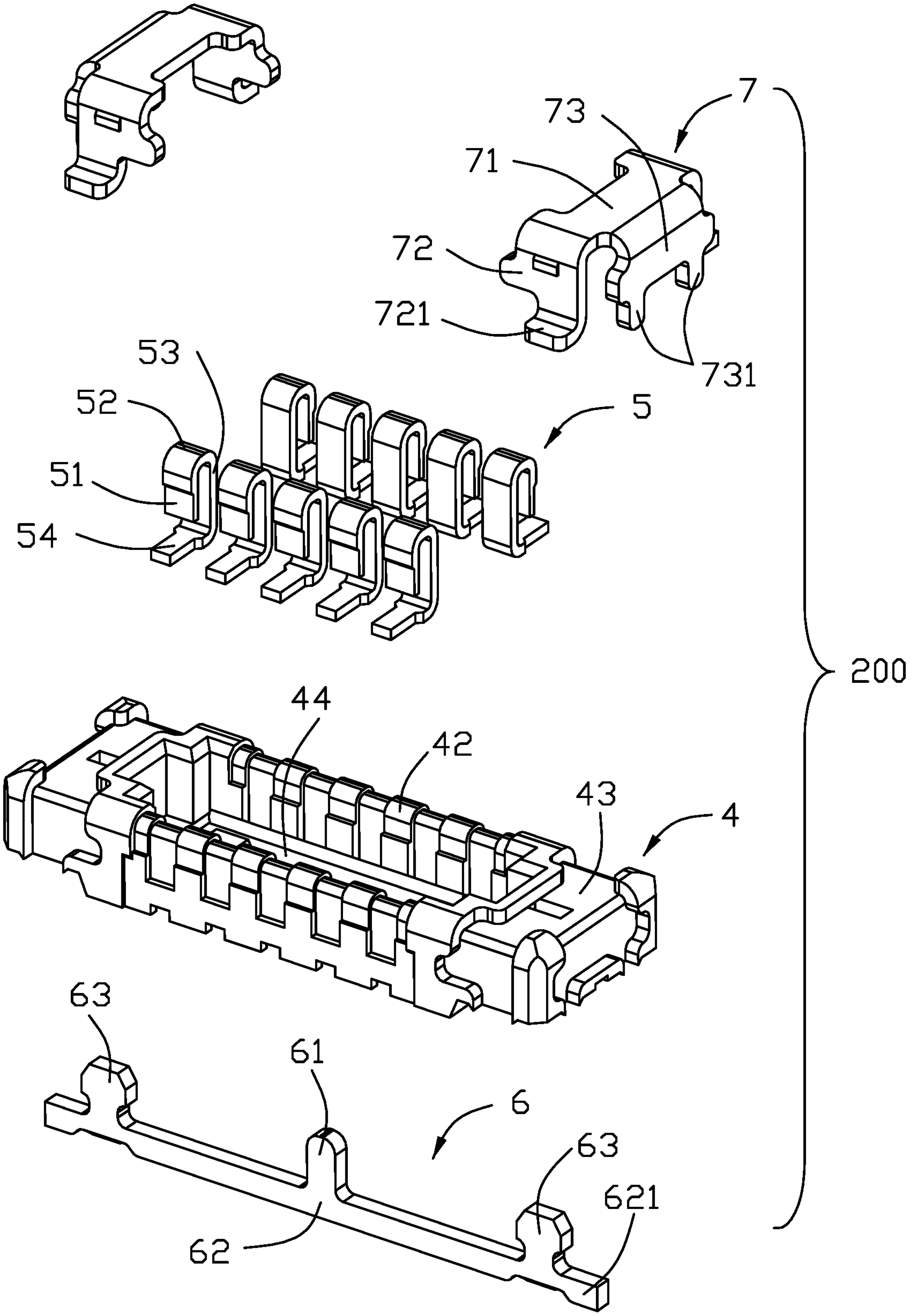
FIG. 5 is an exploded view of a mating electrical connector of the electrical connector assembly.
Figure 6:
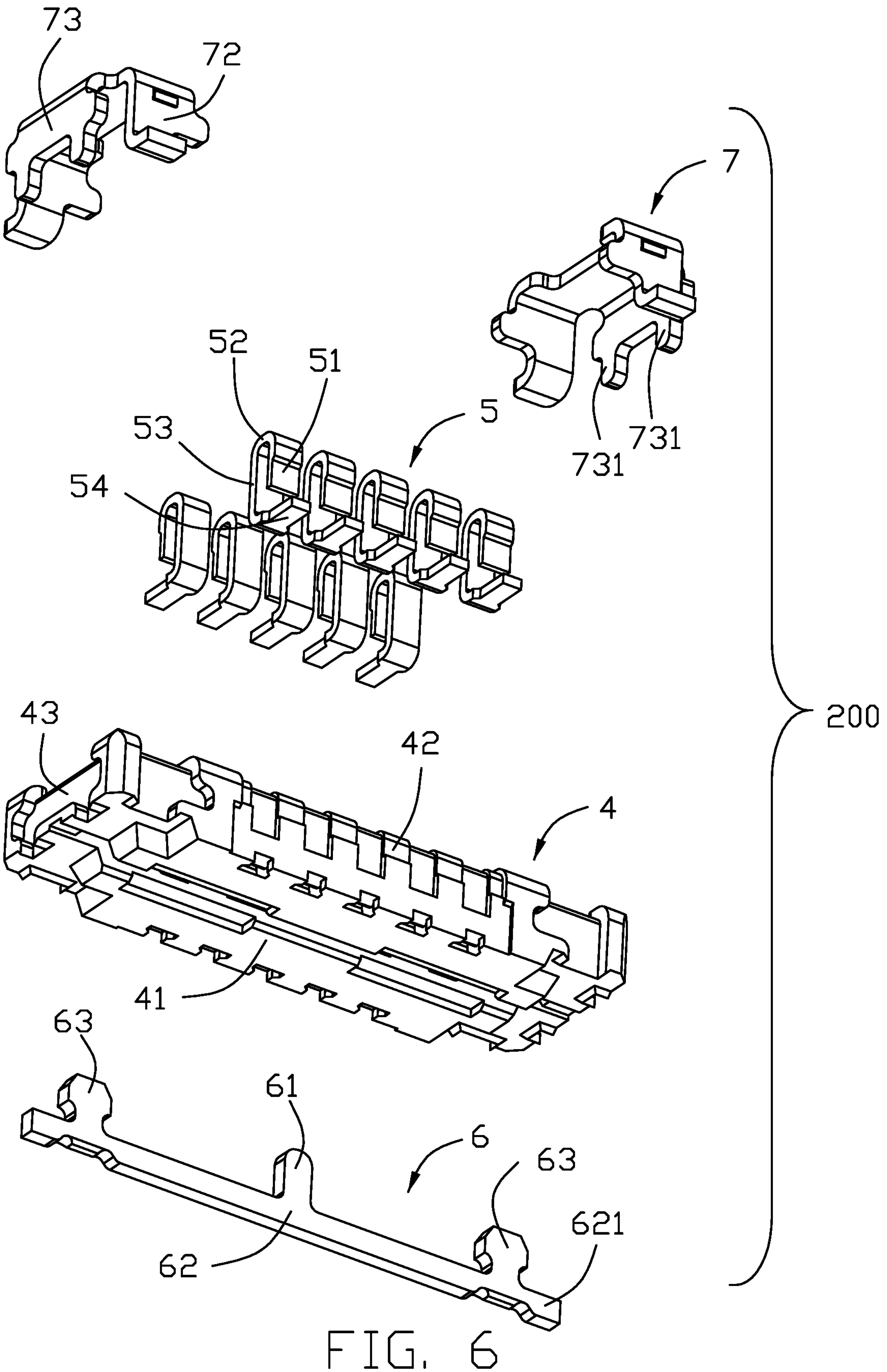
FIG. 6 is another exploded view of the mating electrical connector.
Figure 7:
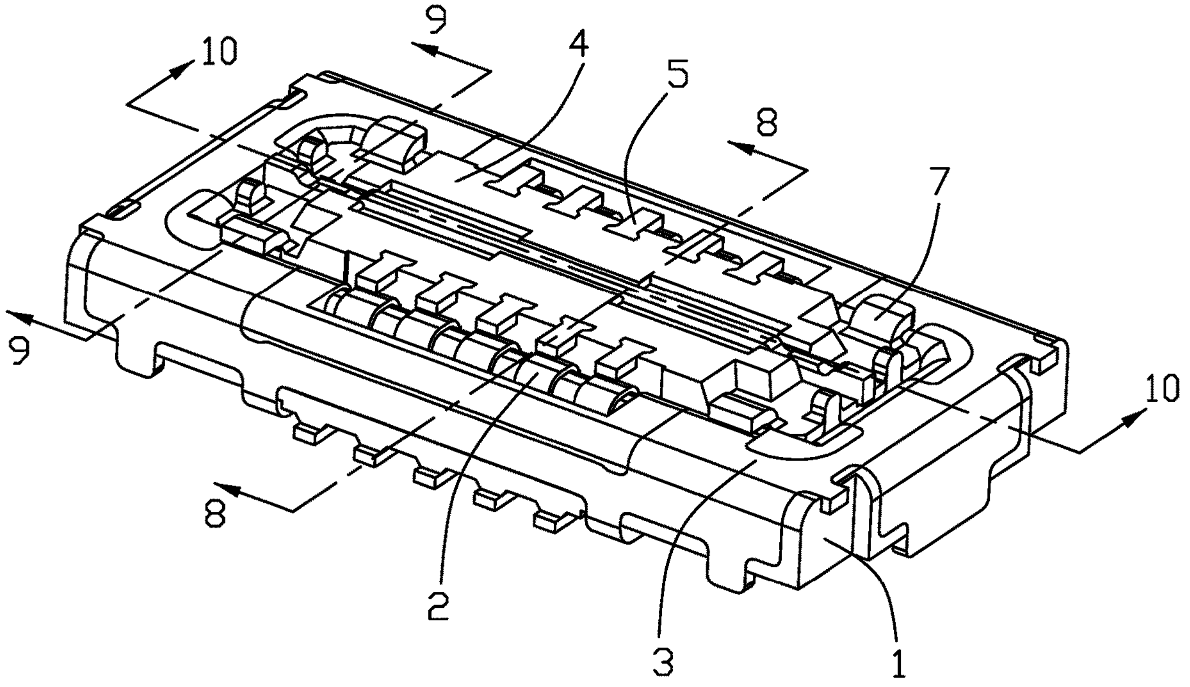
FIG. 7 is an assembled perspective view of the electrical connector assembly.
Figure 8:
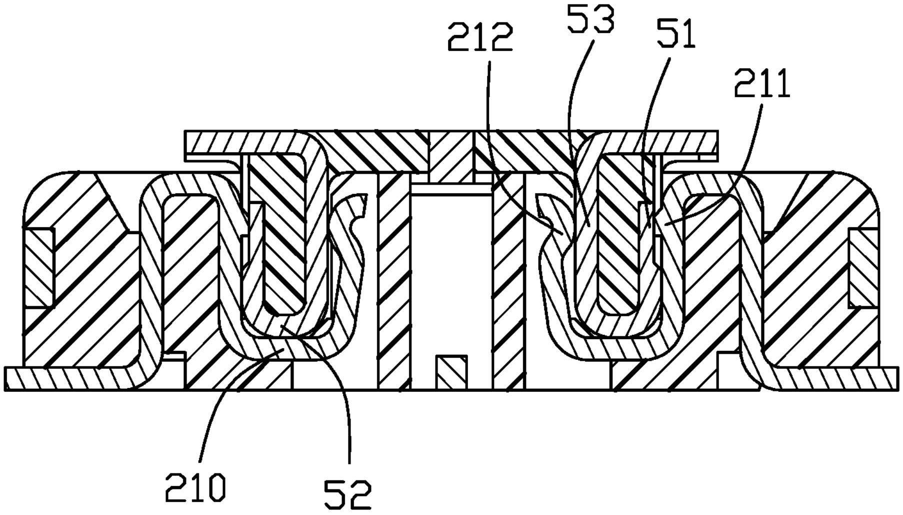
FIG. 8 is a cross-sectional view of the electrical connector assembly taken along line A-A in FIG. 7.
Figure 9:
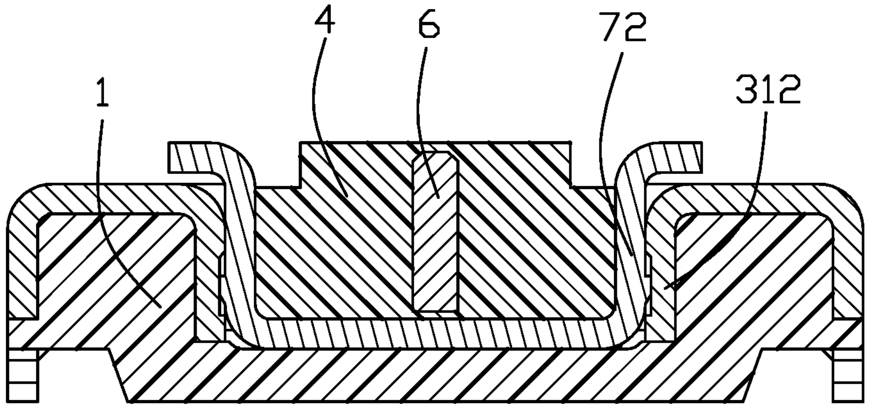
FIG. 9 is a cross-sectional view of the electrical connector assembly taken along line B-B in FIG. 7.
Figure 10:
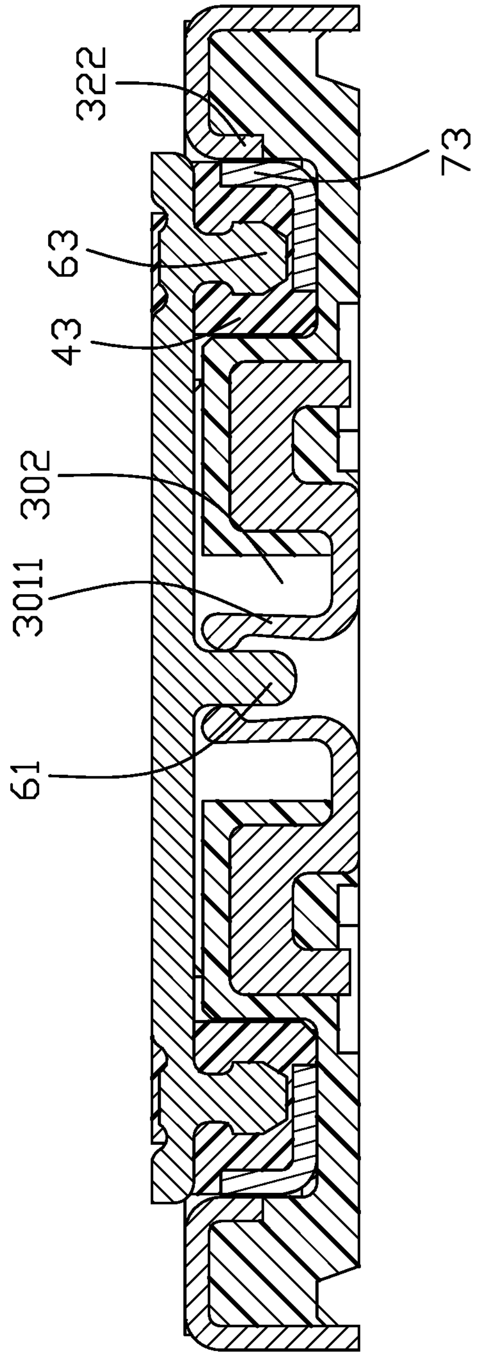
FIG. 10 is a cross-sectional view of the electrical connector assembly taken along line C-C in FIG. 7.

As best seen in FIGS. 5 and 6, the insulative housing 4 of the electrical connector 200 has a base 41 and a pair of longitudinal walls 42 and a pair of end walls 43, which together define a receiving channel 44. The contacts 5 are arranged, e.g., insert-molded, with the insulative housing 4 in two rows in a manner known in this art. Each contact 5 has a first contacting portion 51, a connecting portion 52, a second contacting portion 53, and a tail 54. The middle grounding piece 6 has a base 62, a pair of securing portions 63, and a middle protrusion 61 for engaging between the pair of opposing fingers 3011 of the grounding member 30. The pair of securing portions 63 are fixed to the pair of end walls 43. The base 62 has a pair of soldering portions 621. Each holding element 7 has a top wall 71, a pair of side walls 72, and an end wall 73. Each side wall 72 has a soldering portion 721. Each end wall 73 has a pair of soldering portions 731.

With the grounding member 30 being an integral part of the metallic shell 3, in contrast to being discrete components, a simplified structure and manufacturing process may be achieved. Also with provision of the pair of opposing fingers 3011 spaced apart a gap, a reliable and effective engagement of the shell 3 to the protrusion 61 of the grounding piece 6 may be obtained.

The invention claimed is:

1. An electrical connector comprising:

an insulative housing having an island and a receiving channel around the island, the island having a slot through an upper surface thereof;

two rows of contacts secured to the insulative housing and exposed to the receiving channel on two opposite sides of the island; and a metallic shell secured to the insulative housing and exposed to the receiving channel, the metallic shell having a unitary grounding member; wherein the grounding member has a pair of opposing fingers spaced apart a gap; and the pair of opposing fingers are located in the slot of the island between the two rows of contacts.

2. The electrical connector as claimed in claim 1, wherein the grounding member comprises a first arm and a second arm separated from the first arm, and one of the pair of opposing fingers is located at a free end of the first arm and the other of the pair of opposing fingers is located at a free end of the second arm.

3. An electrical connector assembly comprising:

a first connector including:

an insulative housing having a receiving channel;

two rows of contacts secured to the insulative housing and exposed to the receiving channel; and a metallic shell secured to the insulative housing and exposed to the receiving channel, the metallic shell having a unitary grounding member; and a second connector including:

an insulative housing;

a plurality of contacts secured to the insulative housing;

a pair of holding elements secured to two opposite ends of the insulative housing; and a middle grounding piece; wherein the grounding member has a pair of opposing fingers and the middle grounding piece has a protrusion engaged between the pair of opposing fingers; and the insulative housing of the first connector includes an island having a slot and the pair of opposing fingers are located in the slot of the island between the two rows of contacts.

4. The electrical connector assembly as claimed in claim 3, wherein the grounding member comprises a first arm and a second arm separated from the first arm, and one of the pair of opposing fingers is located at a free end of the first arm and the other of the pair of opposing fingers is located at a free end of the second arm.

* * * * *